Patented Oct. 14, 1930

1,778,019

UNITED STATES PATENT OFFICE

SELWYN GWILLYM BLAYLOCK, FREDERICK ERIC LEE, AND JOHN JAMES FINGLAND, OF TRAIL, BRITISH COLUMBIA, CANADA, ASSIGNORS TO THE CONSOLIDATED MINING AND SMELTING COMPANY OF CANADA, LIMITED, OF MONTREAL, QUEBEC, CANADA, A CORPORATION OF CANADA

PROCESS FOR AND RELATING TO RECOVERING GOLD, SILVER, AND LEAD FROM ROASTED OR OXIDIZED ANTIMONIAL ORES, ANTIMONIAL FLUE DUSTS, AND ANTIMONIAL BY-PRODUCTS

No Drawing. Application filed May 3, 1929, Serial No. 360,303, and in Canada May 21, 1928.

Our invention relates to the reduction of roasted or oxidized antimony ores, antimony flue dust, and antimonial by-products, containing antimony oxide, gold, silver and lead in such a manner that these contained metals are substantially concentrated into a fractional portion of resultant product whilst the antimony metal is recovered substantially free from gold, silver and lead.

To facilitate the recovery of the antimony, gold, silver, and lead contained in the roasted or oxidized antimony ores, antimony flue dusts and antimonial by-products, the antimonial charge is admixed with lead in such proportions that for every four parts of gold present there are at least 100 parts of lead present over and above the proportion, if any, of lead required for the silver; and for every 2.25 parts of silver present there are at least 100 parts of lead present over and above the proportion, if any, of lead required for the gold. Thus, in the absence of a sufficiency of lead to meet these proportions additional lead is admixed with the antimonial charge to bring the admixture up to these proportions but it is not advisable to exceed these proportions as the lead contents of the charge should be as small as conditions will allow, to avoid the re-treatment of greater proportions of lead-antimony products for the recovery of the contained gold, silver, and lead.

To facilitate its reduction the antimonial charge is further admixed with an excess of carbonaceous matter, to which is added from two to five per cent of soda ash. The admixed charge is reduced in a reverberatory furnace and the reduced antimony metal is tapped directly from the furnace into a mould, of sufficient size to receive a full furnace charge, of such nature that the reduced metal will be cast into a solid block having the least practicable superficial area, and so constructed that it can be surrounded by a considerable thicknes of heat insulating material. The initial temperature of the cast metal should be sufficient to insure that it will solidify very slowly and segregate into two fractions, one surrounding the other. The outer one of these fractions contains the major part of the antimony metal substantially free from gold, silver and lead, and the other or inner one contains the antimony lead alloy in which is concentrated the major proportion of the gold, silver and lead. When the cast metal has solidified and cooled sufficiently it is broken up and the two fractions are separated. The one consisting of antimony metal substantially free from the contained gold, silver and lead and the other consisting of the antimony lead alloy in which the gold, silver, and lead are concentrated, may be treated for the recovery of the contained metals by known metallurgical methods.

Having thus fully described our invention, what we claim as new and desire to secure by Letters Patent is:

1. A process for the recovery of gold, silver and lead from roasted or oxidized antimony ores, antimonial flue dust, and antimonial by-products containing gold, silver, and lead, which comprises admixing lead with the antimonial charge in such proportions that the silver content of the charge does not exceed 2.25 parts for every one hundred parts of the contained lead over and above the lead required for the gold; and the gold content does not exceed 4 parts for every one hundred parts of the contained lead over and above the lead required for the silver, and further admixing with the antimonial charge carbonaceous matter and soda ash, for reducing the charge, and casting the reduced metal into a block surrounded by a considerable thickness of heat insulating material so that the block will solidify slowly, and the contained metals therein will segregate into two fractions, one surrounding the other, the outer one containing antimony metal substantially free of gold, silver and lead, and the inner one containing the major portion of the gold, silver, and lead.

2. A process for the recovery of gold, silver and lead from roasted or oxidized antimony ores, antimonial flue dust, and antimonial by-products containing gold, silver, and lead, which comprises admixing lead with the antimonial charge in such proportions that the silver content of the charge does not exceed 2.25 parts for every one hundred parts of the contained lead over and above the lead required for the gold; and the gold content does not exceed 4 parts for every one hundred parts of the contained lead over and above the lead required for the silver, and further admixing with the antimonial charge carbonaceous matter and soda ash, for reducing the charge, casting the reduced metal into a block surrounded by a considerable thickness of heat insulating material so that the block will solidify slowly, and the metals therein will segregate into two fractions, one surrounding the other, the outer one containing antimony metal substantially free of gold, silver, and lead and the inner one containing the major portion of the gold, silver, and lead, and recovering from each fraction the respective metals by known metallurgical methods.

Dated at the city of Trail, in the District of Kootenay and Province of British Columbia, this 7th day of March, 1929.

SELWYN GWILLYM BLAYLOCK.
JOHN JAMES FINGLAND.
FREDERICK ERIC LEE.